United States Patent
Kim et al.

(10) Patent No.: US 10,386,942 B2
(45) Date of Patent: Aug. 20, 2019

(54) ELECTRONIC DEVICE INCLUDING ROTARY MEMBER AND DISPLAY METHOD THEREOF

(71) Applicant: Samsung Electronics Co., Ltd., Gyeonggi-do (KR)

(72) Inventors: Keun Young Kim, Seoul (KR); Cheol Hoon Kang, Seoul (KR); So Ra Kim, Seoul (KR); Seung Hwan Hong, Gyeonggi-do (KR); Hye Gyung Geum, Seoul (KR); Lee Bin Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/137,783

(22) Filed: Apr. 25, 2016

(65) Prior Publication Data
US 2016/0313810 A1 Oct. 27, 2016

(30) Foreign Application Priority Data

Apr. 23, 2015 (KR) .................. 10-2015-0057384
Sep. 3, 2015 (KR) .................. 10-2015-0124602

(51) Int. Cl.
*G06F 3/0362* (2013.01)
*G06F 1/16* (2006.01)
(Continued)

(52) U.S. Cl.
CPC .......... *G06F 3/0362* (2013.01); *G06F 1/163* (2013.01); *G06F 1/169* (2013.01); *G06F 3/0338* (2013.01);
(Continued)

(58) Field of Classification Search
CPC ...... G09G 3/20; G09G 3/2051; G09G 3/2003; G09G 3/2055; G09G 5/02;
(Continued)

(56) References Cited

U.S. PATENT DOCUMENTS 5,856,827 A * 1/1999 Sudo .................. G06F 3/0482
                                                         345/157
6,556,222 B1 * 4/2003 Narayanaswami .. G04G 9/0064
                                                         368/295
(Continued)

FOREIGN PATENT DOCUMENTS

EP 1 832 969 9/2007
EP 2 733 598 5/2014
(Continued)

OTHER PUBLICATIONS

International Search Report dated Aug. 8, 2016 issued in counterpart application No. PCT/KR2016/004114, 13 pages.
(Continued)

*Primary Examiner* — Grant Sitta
(74) *Attorney, Agent, or Firm* — The Farrell Law Firm, P.C.

(57) ABSTRACT

An electronic device and a display method thereof are provided. The electronic device includes a display; a rotary member configured to surround the display and to rotate around the display; and a control module configured to display a plurality of object groups on a plurality of layers of the display according to rotation of the rotary member.

13 Claims, 13 Drawing Sheets

(51) Int. Cl.
*G06F 3/0338* (2013.01)
*G06F 3/0481* (2013.01)

(52) U.S. Cl.
CPC ........ *G06F 3/0481* (2013.01); *G06F 3/04817* (2013.01)

(58) Field of Classification Search
CPC ........... G06F 2203/041; G06F 3/03547; G06F 3/041; G06F 3/0412; G06F 3/0414; G06F 3/0416; G06F 3/0418; G06F 3/046; G06F 3/047; G06F 2203/013; G06F 2203/014; G06F 2203/015; G06F 3/011; G06F 3/012; G06F 3/013; G06F 3/014; G06F 3/016; G06F 3/0362; G06F 3/04817; G06F 1/169; G06F 1/163; G06F 3/0338; G06F 3/0481; H05K 9/0073; H05K 9/00
USPC .................................................. 345/173, 156
See application file for complete search history.

(56) References Cited

U.S. PATENT DOCUMENTS

| | | | | |
|---|---|---|---|---|
| 7,081,905 | B1 * | 7/2006 | Raghunath | G04G 5/00 345/684 |
| 7,730,425 | B2 * | 6/2010 | de los Reyes | G06F 9/4443 715/834 |
| 7,765,495 | B2 | 7/2010 | Choi et al. | |
| 7,778,118 | B2 | 8/2010 | Lyons et al. | |
| 8,005,506 | B2 | 8/2011 | Choi et al. | |
| 8,386,961 | B2 * | 2/2013 | Buffet | G06F 3/0482 715/825 |
| 8,633,900 | B2 | 1/2014 | Jin et al. | |
| 8,994,827 | B2 | 3/2015 | Mistry et al. | |
| 9,030,446 | B2 | 5/2015 | Mistry et al. | |
| 9,207,776 | B2 * | 12/2015 | Jiang | G06F 3/0236 |
| 9,348,320 | B1 * | 5/2016 | Defazio | G04G 11/00 |
| 9,619,118 | B2 * | 4/2017 | Vakharia | G06F 3/0484 |
| 9,696,963 | B2 * | 7/2017 | Son | G06F 3/04847 |
| 10,222,909 | B2 * | 3/2019 | Shedletsky | G06F 3/0362 |
| 2003/0103032 | A1 * | 6/2003 | Wong | G06F 1/1626 345/156 |
| 2004/0243342 | A1 * | 12/2004 | Rekimoto | G06F 3/011 702/150 |
| 2005/0007337 | A1 * | 1/2005 | Sellen | G04G 9/0064 345/156 |
| 2005/0044509 | A1 * | 2/2005 | Hunleth | G06F 3/0482 715/834 |
| 2006/0035628 | A1 * | 2/2006 | Miller | H04M 3/493 455/414.3 |
| 2006/0268560 | A1 * | 11/2006 | Wong | G06F 1/1626 362/480 |
| 2007/0103454 | A1 | 5/2007 | Elias | |
| 2007/0211042 | A1 * | 9/2007 | Kim | G04C 3/005 345/184 |
| 2007/0247976 | A1 * | 10/2007 | Capozzi | G04G 9/0064 368/82 |
| 2007/0260994 | A1 * | 11/2007 | Sciammarella | G06F 3/0481 715/769 |
| 2007/0271528 | A1 * | 11/2007 | Park | G06F 3/0482 715/810 |
| 2008/0171572 | A1 | 7/2008 | Choi et al. | |
| 2008/0172634 | A1 | 7/2008 | Choi et al. | |
| 2008/0204424 | A1 | 8/2008 | Jin et al. | |
| 2009/0059730 | A1 | 3/2009 | Lyons et al. | |
| 2012/0194507 | A1 * | 8/2012 | Lee | G06F 1/1694 345/419 |
| 2014/0035942 | A1 | 2/2014 | Yun et al. | |
| 2014/0137037 | A1 | 5/2014 | Jin et al. | |
| 2014/0139422 | A1 | 5/2014 | Mistry et al. | |
| 2014/0139454 | A1 | 5/2014 | Mistry et al. | |
| 2014/0139486 | A1 | 5/2014 | Mistry et al. | |
| 2014/0139637 | A1 | 5/2014 | Mistry et al. | |
| 2014/0143678 | A1 | 5/2014 | Mistry et al. | |
| 2014/0143737 | A1 | 5/2014 | Mistry et al. | |
| 2014/0143784 | A1 | 5/2014 | Mistry et al. | |
| 2014/0143785 | A1 | 5/2014 | Mistry et al. | |
| 2014/0195979 | A1 * | 7/2014 | Branton | G06F 3/0482 715/834 |
| 2016/0085286 | A1 * | 3/2016 | Zhou | G06F 1/1637 345/156 |

FOREIGN PATENT DOCUMENTS

| | | |
|---|---|---|
| KR | 10-2008007810 | 8/2008 |
| KR | 1020140017420 | 2/2014 |
| KR | 10-1467144 | 12/2014 |
| WO | WO 2015/034966 | 3/2015 |

OTHER PUBLICATIONS

European Search Report dated Aug. 26, 2016 issued in counterpart application No. 16166459.4-1959, 7 pages.

European Search Report dated Feb. 26, 2018 issued in counterpart application No. 16166459.4-1221, 7 pages.

* cited by examiner

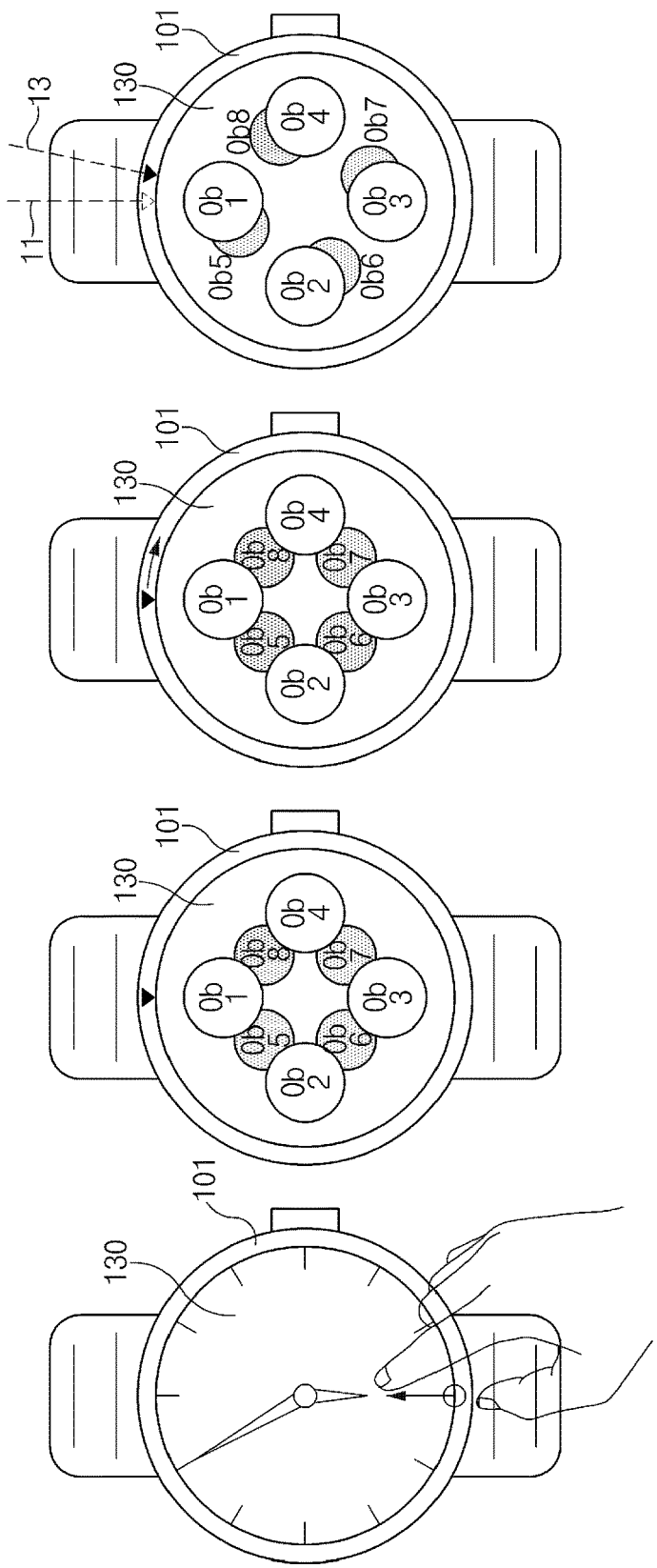

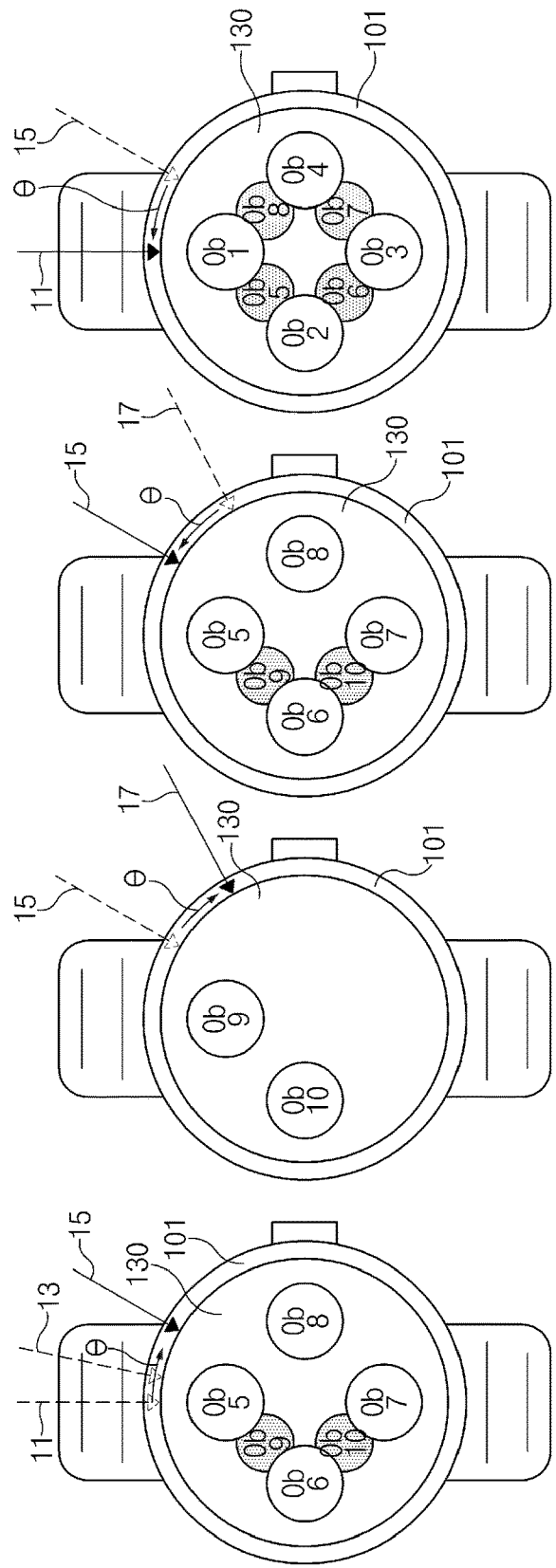

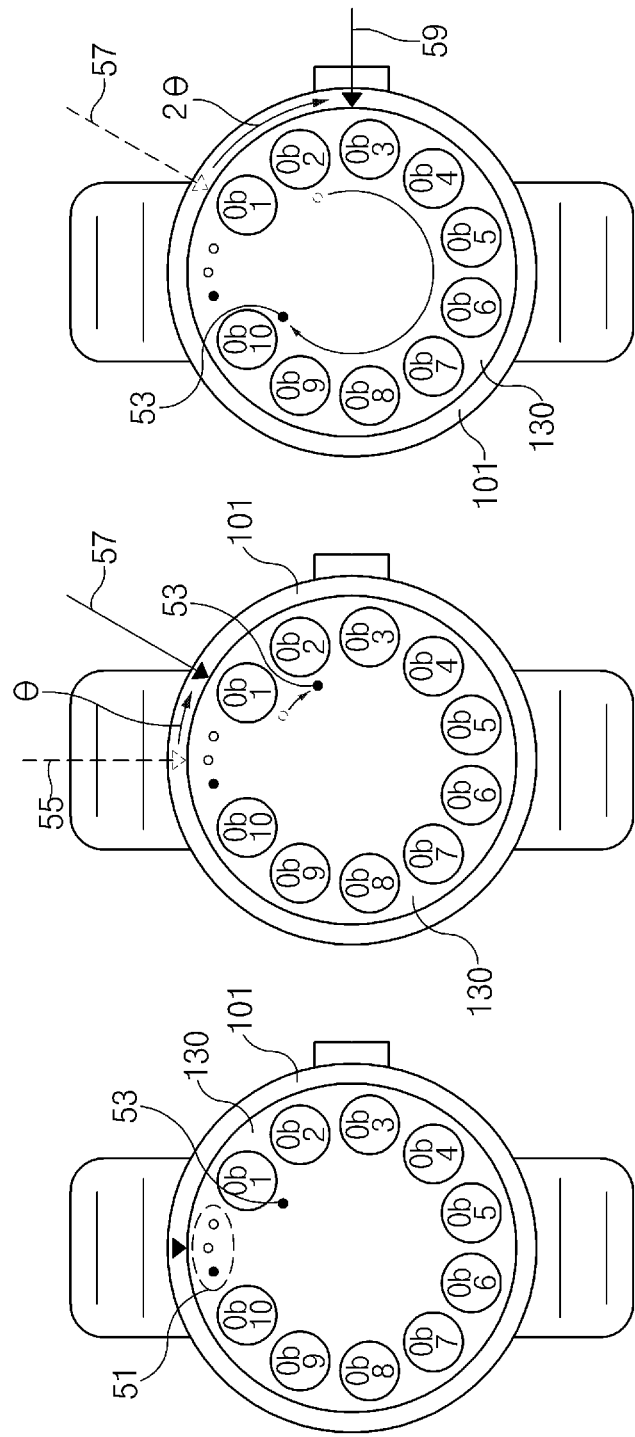

ELECTRONIC DEVICE INCLUDING ROTARY MEMBER AND DISPLAY METHOD THEREOF

PRIORITY

This application claims priority under 35 U.S.C. § 119(a) to Korean Patent Application Serial Nos. 10-2015-0057384 and 10-2015-0124602, which were filed in the Korean Intellectual Property Office on Apr. 23, 2015 and Sep. 3, 2015, respectively, the entire disclosure of which is incorporated herein by reference.

BACKGROUND

1. Field of the Disclosure

The present disclosure relates generally to an electronic device for displaying content according to a rotary input by a rotary member and a display method thereof.

2. Description of the Related Art

Recently, the development of wearable, portable electronic devices, such as smart watches and smart glasses, has increased. A wearable electronic device may interwork with a main electronic device, such as a smartphone, and provide a variety of services.

The above-mentioned portable electronic device may include a display for providing content to a user and an input device for receiving a user input. For example, the input device may be implemented as a touch screen display. However, the display included in a portable electronic device, especially a wearable device, often has a limited size in order to guarantee portability of the portable electronic device.

However, the small display in the portable electronic device may only display limited content at one time. Therefore, the portable electronic device often reduces or divides content and provides the reduced or divided content to the user.

Also, user input through the small display may be difficult to enter and/or result an input error.

SUMMARY

Accordingly, the present disclosure is made to address at least the above-mentioned problems and/or disadvantages and to provide at least the advantages described below.

An aspect of the present disclosure is to provide an electronic device and a display method thereof for providing an efficient user interface through a separate input device included in the electronic device.

Another aspect of the present disclosure is to provide an electronic device and a display method thereof for providing a plurality of content on a small display.

In accordance with an aspect of the present disclosure, an electronic device is provided. The electronic device includes a display, a rotary member configured to surround the display and to rotate around the display, and a control module configured to display a plurality of object groups on a plurality of layers of the display according to rotation of the rotary member.

In accordance with another aspect of the present disclosure, a display method of an electronic device is provided. The display method includes displaying a first object group including at least one first object on a first layer of a display, detecting rotation of a rotary member, and displaying a second object group including at least one second object according to the rotation of the rotary member. The rotary member surrounds and rotates around the display.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A, 6B, 6C, 6D, 6E, 6F, 6G, and 6H illustrate a user interface according to an embodiment of the present disclosure;

FIGS. 10A, 10B, and 10C illustrate a user interface according to an embodiment of the present disclosure;

Throughout the drawings, like reference numbers and labels may be used to depict the same or similar elements, features, and structures.

DETAILED DESCRIPTION

Figure 1:
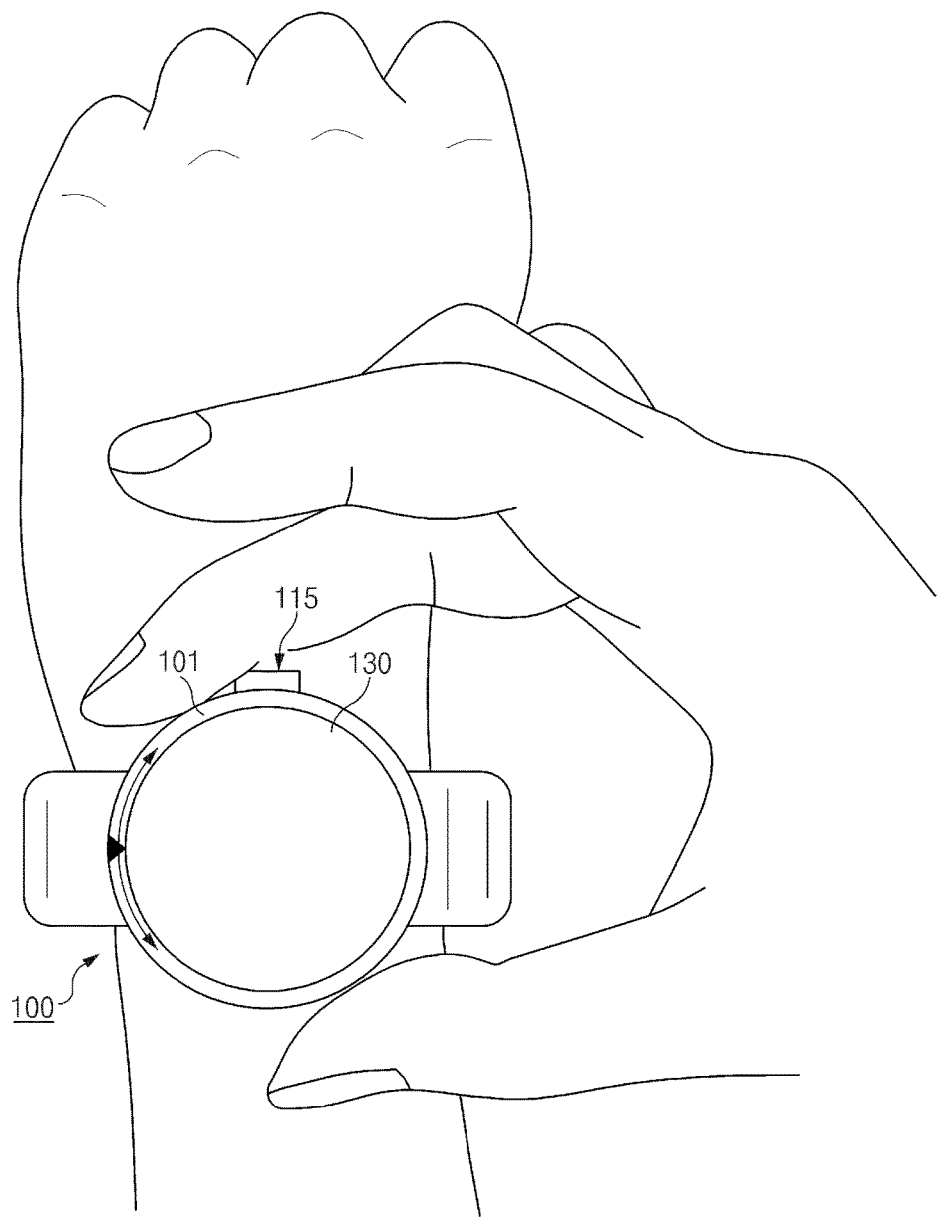
FIG. 1 illustrates a use environment of an electronic device according to an embodiment of the present disclosure.

Hereinafter, various embodiments of the present disclosure are described with reference to the accompanying drawings. However, the present disclosure is not limited to these specific embodiments, and should include all modifications and/or, equivalents and substitutes within the scope and technical range of the present disclosure.

Terms and expressions used herein to describe embodiments of the present disclosure are not intended to limit the scope of the present disclosure. The terms of a singular form may include plural forms unless otherwise specified. Unless otherwise defined herein, all the terms used herein, which include technical or scientific terms, may have the same meanings that are generally understood by a person skilled in the art. Terms, which are defined in a dictionary and commonly used, should also be interpreted as is customary in the relevant related art and not in an idealized or overly formal definition unless expressly so defined as such herein. In some cases, even if terms are defined in the specification, they may not be interpreted to exclude embodiments of the present disclosure.

Herein, the expressions "have", "may have", "include" and "comprise", "may include" and "may comprise" indicate the existence of corresponding features (e.g., elements such as numeric values, functions, operations, or components), but do not exclude the presence of additional features.

The expressions "A or B", "at least one of A or/and B", "one or more of A or/and B", etc., include any and all combinations of one or more of the associated listed items. For example, the term "A or B", "at least one of A and B", or "at least one of A or B" may refer to (1) where at least one A is included, (2) where at least one B is included, or (3) where both of at least one A and at least one B are included.

Numerical expressions, such as "1st", "2nd", "first", "second", etc., may refer to various elements irrespective of the order and/or priority of the corresponding elements, and do not limit the corresponding elements. The expressions may be used to distinguish one element from another element. For example, "a first user device" and "a second user device" indicate different user devices, irrespective of an order and/or a priority of the user devices. Accordingly, a first component may be referred to as a second component and vice versa, without departing from the scope of the present disclosure.

When an element (e.g., a first element) is referred to as being "(operatively or communicatively) coupled with/to" or "connected to" another element (e.g., a second element), the first element can be directly coupled with/to or connected to the second element or an intervening element (e.g., a third element) may be present therebetween. However, when the first element is referred to as being "directly coupled with/to" or "directly connected to" the second element, no intervening element may be present therebetween.

Depending on context, the expression "configured to" may mean "suitable for", "having the capacity to", "designed to", "adapted to", "made to", or "capable of". The term "configured to" does not necessarily indicate only "specifically designed to" using hardware. Instead, the expression "a device configured to" may indicate that the device is "capable of" operating together with another device or other components. For example, a "processor configured to perform A, B, and C" may indicate a generic-purpose processor (e.g., a central processing unit (CPU) or an application processor) which may perform corresponding operations by executing one or more software programs and stores a dedicated processor (e.g., an embedded processor) for performing a corresponding operation.

An electronic device according to an embodiment of the present disclosure may include a smart phone, a tablet personal computer (PC), a mobile phone, a video telephone, an electronic book reader, a desktop PC, a laptop PC, a netbook computer, a workstation, a server, a personal digital assistant (PDA), a portable multimedia player (PMPs), a Motion Picture Experts Group (MPEG-1 or MPEG-2) Audio Layer 3 (MP3) player, a mobile medical device, a camera, or a wearable device, e.g., an accessory-type wearable device, such as a watch, a ring, a bracelets, an anklet, a necklace, glasses, contact lenses, a head-mounted-device (HMD) etc., fabric or clothing integral wearable devices (e.g., electronic clothes), body-mounted wearable devices (e.g., skin pads or tattoos), or implantable wearable devices (e.g., implantable circuits).

The electronic devices may also be smart home appliances, such as a television (TV), a digital versatile disk (DVD) player, an audio player, a refrigerator, an air conditioner, a cleaner, an oven, a microwave oven, a washing machine, an air cleaner, a set-top box, a home automation control panel, a security control panel, a TV box (e.g., Samsung HomeSync®, Apple TV®, or Google TV®), a game console (e.g., Xbox® and PlayStation®), an electronic dictionary, an electronic key, a camcorder, or an electronic picture frame.

The electronic devices may also be a medical device, such as a portable medical measurement device (e.g., a blood glucose meter, a heart rate meter, a blood pressure meter, a thermometer, etc.), a magnetic resonance angiography (MRA) device, a magnetic resonance imaging (MRI) device, a computed tomography (CT) device, a scanner, an ultrasonic device, etc.), a navigation device, a global navigation satellite system (GNSS), an event data recorder (EDR), a flight data recorder (FDR), a vehicle infotainment device, electronic equipment for a vessel (e.g., a navigation system, a gyrocompass, etc.), an avionics device, a security device, a head units for a vehicle, an industrial or home robot, an automatic teller machine (ATM), a point of sale (POS) device, or an Internet of Things (IoT) device (e.g., a light bulb, a sensor, an electric or gas meter, a sprinkler device, a fire alarm, a thermostat, a street lamp, a toaster, an exercise device, a hot water tank, a heater, a boiler, etc.).

The electronic devices may also be a piece of furniture or a building/structure, an electronic board, an electronic signature receiving device, a projector, or a measuring instrument (e.g., a water meter, an electricity meter, a gas meter, a wave meter, etc.).

The electronic device may also be a flexible electronic device.

An electronic device according to an embodiment of the present disclosure may be one or more combinations of the above-described example devices. Also, the electronic device is not limited to the above-described example devices, and may include a new or different electronic device.

Herein, the term "user" may refer to a person who uses an electronic device or may refer to a device (e.g., an artificial intelligence (AI) electronic device) that uses the electronic device.

FIG. 1 illustrates a use environment of an electronic device according to an embodiment of the present disclosure. Although FIG. 1 illustrates an electronic device 100 as a smart watch, which may be worn on a wrist of the user, the present disclosure is not limited to a smart watch. For example, the electronic device 100 may be another wearable device (e.g., a smart band, smart glasses, etc.) which may be worn on a user's head, arm, wrist, leg, waist, etc.

Referring to FIG. 1, the electronic device 100 includes a rotary member 101, a button 115, and a display 130. The rotary member 101 surrounds an outer side (or a rim) of the display 130. For example, the rotary member 101 may be configured with a ring form that surrounds the outer side of the display 130. The rotary member 101 rotates along the outer side of the display 130. For example, the rotary member 101 may rotate along the outer side of the display 130 in a clockwise or counterclockwise direction.

The button 115 is configured at a side of the electronic device 100 and may receive a user input when pressed by the user.

The display 130 may display a user interface. For example, the display 130 may display an object group including at least one object, e.g., an icon corresponding to an application, a menu, or a notification message. The display 130 may change and display a user interface according to a user input, which is input using the rotary member 101 or the button 115.

Figure 2:
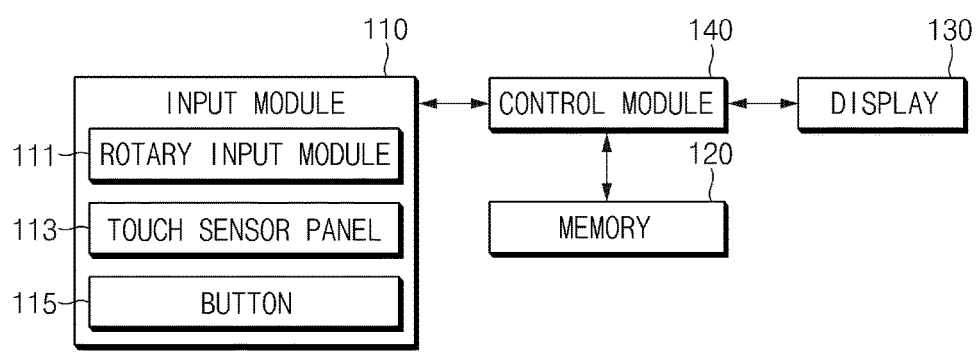
FIG. 2 illustrates an electronic device according to an embodiment of the present disclosure.

FIG. 2 illustrates an electronic device according to an embodiment of the present disclosure.

Referring to FIG. 2, the electronic device includes an input module 110, a memory 120, a display 130, and a control module 140.

The input module 110 may receive a user input. For example, the input module 110 may receive a user input for displaying an object group on the display 130 or a user input for changing an object group already displayed on the display 130.

The input module 110 includes a rotary input module 111, a touch sensor panel 113, and a button 115. The rotary input module 111 receives a rotary input of a user. For example, the rotary input module 111 may include a rotary member 101 as illustrated in FIG. 1.

The rotary input module 111 may receive a rotary input of the user according to rotation of the rotary member 101. The rotary member 101 may rotate at intervals of a predetermined angle (e.g., an angle of 15 or 30 degrees). That is, if a rotation angle by a user operation is different from the intervals of the predetermined angle, the rotary member 101 may automatically rotate at a rotation angle (e.g., multiples of the predetermined angle) corresponding to the intervals of the predetermined angle. For example, if the predetermined angle is 15 degrees, the rotary member 101 may automatically rotate at an angle corresponding to multiples of 15 degrees (e.g., 0 degree, 15 degrees, 30 degrees, 45 degrees, 60 degrees, . . . , 345 degrees, and 360 degrees).

If a rotation angle input by a user operation is different from intervals of a predetermined angle, the rotary member 101 may automatically rotate (e.g., physically rotate) to the closest angle among multiples of the predetermined angle. For one example, if the predetermined angle is the angle of 15 degrees, but the rotation angle input by the user operation is only 10 degrees, the rotary member 101 may automatically rotate at the angle of 15 degrees. As another example, if the predetermined angle is 15 degrees, but the rotation angle input by the user operation is only 7 degrees, the rotary member 101 may automatically rotate to an original position (i.e., at an angle of 0 degrees).

The touch sensor panel 113 may receive a touch input of the user. For example, the touch sensor panel 113 may use at least one of an electrostatic type, a resistive type, an infrared type, or an ultrasonic type. The touch sensor panel 113 may be implemented with a touch screen that is coupled to the display 130.

The button 115 may receive a user input when pressed by the user.

The memory 120 may store at least one object group (e.g., a plurality of object groups) to be displayed on the display 130. The object group may include at least one object. For example, the object may include an application icon, a menu icon, a notification message icon, an object for selecting another object group, etc.

The memory 120 may store an object group for each type of an object. For example, the memory 120 may store an object group including an application icon and a plurality groups including notification message icons that independent of each other.

Figure 3A:
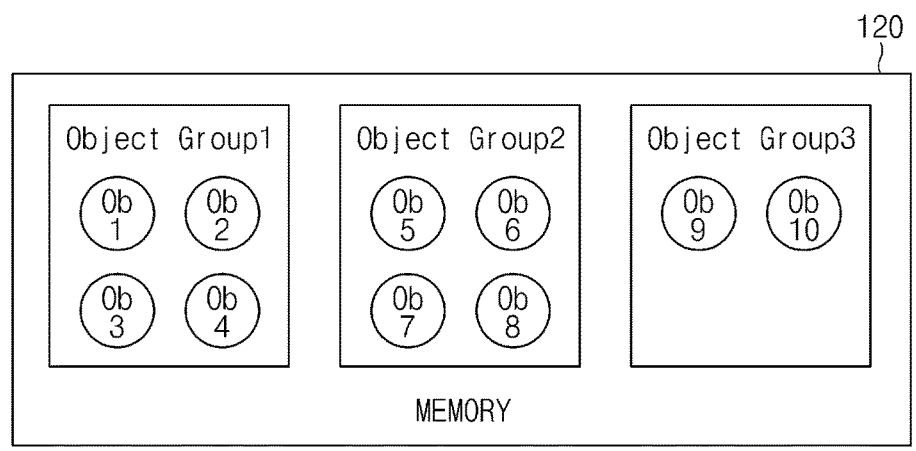
FIGS. 3A and 3B illustrate object groups stored in a memory according to an embodiment of the present disclosure.
Figure 3B:
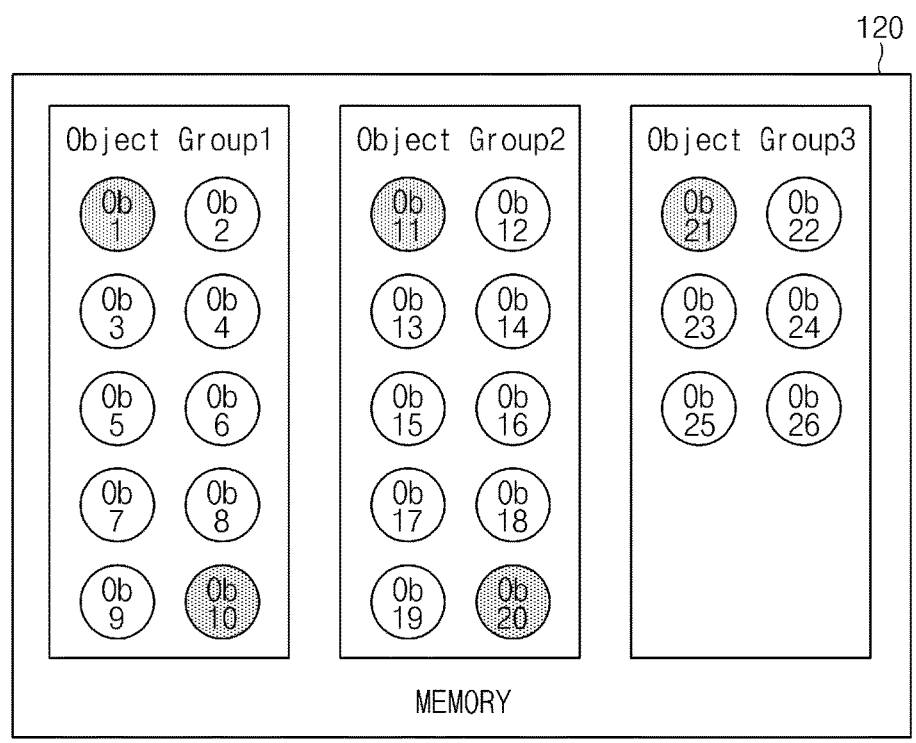

FIGS. 3A and 3B illustrates object groups stored in a memory according to an embodiment of the present disclosure.

Referring to FIGS. 3A and 3B, a memory 120 stores a plurality of object groups. The number of objects that may be included in one object group may be limited. For example, an object group may have a predetermined maximum number or less of objects (e.g., four or ten objects or less) included therein.

Referring to FIG. 3A, if a maximum number of objects that may be included in one object group is set to four objects, the memory 120 classifies ten objects into three object groups and stores the objects corresponding to the classified object groups. For example, the $1^{st}$ to $4^{th}$ objects (Ob 1 to Ob 4) are included in Object Group 1, the $5^{th}$ to $8^{th}$ objects Ob 5 to Ob 8) are included in Object Group 2, and the $9^{th}$ and $10^{th}$ objects (Ob 9 and Ob 1) are included in Object Group 3.

Referring to FIG. 3B, if a maximum number of objects that may be included in one object group is set to ten objects, the memory 120 classifies 26 objects into three object groups and stores the objects corresponding to the classified object groups. For example, the $1^{st}$ to $10^{th}$ objects (Ob 1 to Ob 10) are included in Object Group 1, the $11^{th}$ to $20^{th}$ objects (Ob 11 to Ob 20) are included in Object Group 2, and the $21^{st}$ to $26^{th}$ are included in Object Group 3.

An object group may include at least one object for selecting another object group. For example, the $10^{th}$ object (Ob 1), the $11^{th}$ object (Ob 11), the $20^{th}$ object (Ob 2), and the $21^{st}$ (Ob 21), which are shaded in FIG. 3B, may be objects for selecting another object group. For example, the $10^{th}$ object (Ob 10) and the $21^{st}$ object (Ob 21) may be objects for selecting Object Group 2, the $11^{th}$ object (Ob 11) may be an object for selecting Object group 1, and the $20^{th}$ object (Ob 20) may be an object for selecting Object Group 3.

An object group stored in the memory 120 may be updated. For one example, if a new application is installed in an electronic device or if a new notification message is generated in the electronic device, a new object may be added to an object group. Further, if an application installed in the electronic device is deleted or a user verifies notification, a corresponding object may be deleted. As another example, an object included in an object group may be deleted or an object group including a specific object may be changed, according to a user instruction.

Referring again to FIG. 2, the display 130 may display a user interface. For example, the display 130 may display a user interface including an object group, if a user input is received.

Figure 4A:
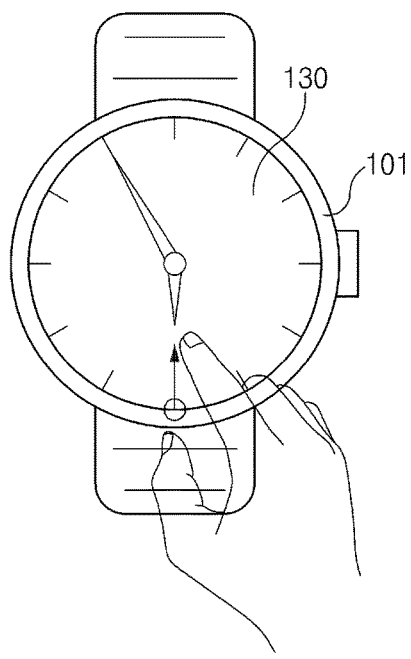
FIGS. 4A and 4B illustrate user inputs according to embodiments of the present disclosure.
Figure 4B:
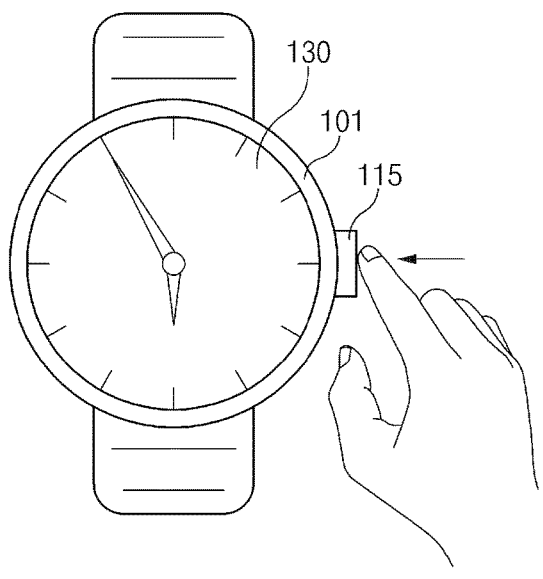

FIGS. 4A and 4B illustrate user inputs according to an embodiments of the present disclosure.

Referring to FIG. 4A, when content (e.g., a watch image) is displayed on a display 130, a user may input a swipe touch operation from an outer side of the display 130 towards an inner side of the display 130. In response, the display 130 may display an object group.

Referring to FIG. 4B, when content (e.g., a watch image) is displayed on the display 130, the user may press a button 115. In response, e.g., if the user presses the button 115 a predetermined number of times, the display 130 may display an object group.

Figure 5A:
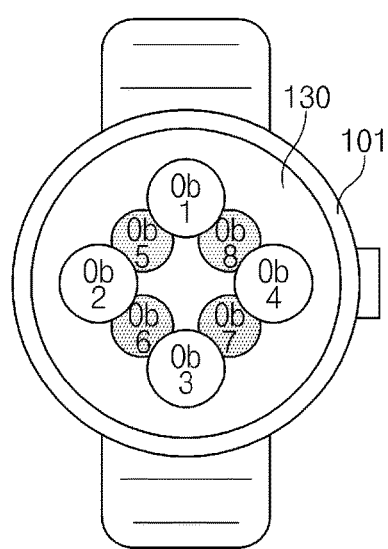
FIGS. 5A and 5B illustrate an object group displayed on a display according to an embodiment of the present disclosure.
Figure 5B:
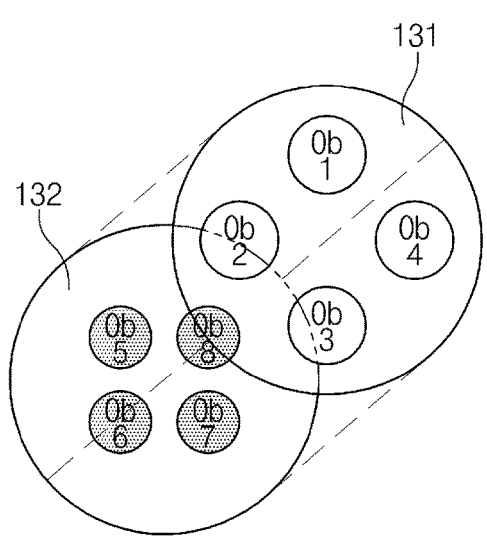

FIGS. 5A and 5B illustrate an object group displayed on a display according to an embodiments of the present disclosure.

Referring to FIG. 5A, a display 130 displays two object groups, where one group includes shaded objects and the other group does not.

Referring to FIG. 5B, the display 130 may display a plurality of layers 131 and 132. The second layer 132 of the display 130 may be operatively disposed under the first layer 131. For example, if at least some of objects included in the first layer 131 and at least some of objects included in the second layer 132 overlap each other, the objects included in the first layer 131 may be displayed first. That is, the objects included in the second layer 132 are displayed, except for regions where they are overlapped by the objects included in the first layer 131.

The display 130 may display a different object group on each of the first and second layers 131 and 132. For example, the display 130 may display a first object group on the first layer 131, and may display a second object group on the second layer 132.

The display 130 may sequentially arrange and display objects included in each of the first and second object groups in a counterclockwise direction. For example, referring to FIG. 5B, a plurality of objects Ob 1, Ob 2, Ob 3, and Ob 4 displayed on the first layer 131 are sequentially disposed in a counterclockwise direction from 12 o'clock. A plurality of objects Ob 5, Ob 6, Ob 7, and Ob 8 displayed on the second layer 132 are sequentially disposed in a counterclockwise direction from 10 o'clock. Alternatively, the display 130 may sequentially arrange and display objects, included in each of the first and second object groups, in a clockwise direction.

The display 130 may display objects displayed on the first layer 131 to be different from objects displayed on the second layer 132. For example, the display 130 may display objects on the first layer 131 as having at least one different size, transparency, and brightness from the objects displayed on the second layer 132. For one example, each of the objects displayed on the first layer 131 may be displayed to become larger and brighter than corresponding one of the objects displayed on the second layer 132. As another example, each of the objects displayed on the second layer 132 may be displayed to become more transparent than each of the objects displayed on the first layer 131.

Although FIGS. 5A and 5B illustrate the display 130 including the two layers 131 and 132, the scope and spirit of the present disclosure is not limited thereto, and the display 130 may include three or more layers.

Referring again to FIG. 2, a control module 140 may control an overall operation of an electronic device. For example, the control module 140 may control the input module 110, the memory 120, and the display 130 to display an object group on the display 130 and to change the displayed object group.

If a user input for displaying an object group is received, the control module 140 may control the display 130 to display the object group on at least one of the first layer 131 or the second layer 132. For example, as illustrated in FIG. 5B, the control module 140 may control the display 130 to display object groups on both of the first layer 131 and the second layer 132. As another example, the control module 140 may control the display 130 to display an object group on only the first layer 131.

The control module 140 may determine a rotation direction and a rotation angle of a rotary member 101. For example, the control module 140 may control the display 130 to change an object group, displayed on the display 130, according to a rotation direction and a rotation angle of the rotary member 101.

If rotation of the rotary member 101 is detected while an object group (e.g., the first object group) is displayed on the first layer 131 and an object group is not displayed on the second layer 132, the control module 140 may control the display 130 to display another object group (e.g., the second object group), on the second layer 132.

The control module 140 may display an object group corresponding to a rotation direction of the rotary member 101 on the second layer 132. For example, if the rotary member 101 rotates in a left direction (or a counterclockwise direction), the control module 140 may control the display 130 to display an object group prior to an object group displayed on the first layer 131. If the rotary member 101 rotates in a right direction (or a clockwise direction), the control module 140 may control the display 130 to display an object group subsequent to an object group displayed on the first layer 131.

The control module 140 may control the display 130 to change at least one of a position, a size, brightness, transparency, or a color of each of the objects displayed on the second layer 132 according to a rotation direction and a rotation angle of the rotary member 101. For example, the objects displayed on the second layer 132 may move in response to a rotation angle and a rotation direction of the rotary member 101. As another example, the objects displayed on the second layer 132 may become larger in size in relation to a rotation angle of the rotary member 101. As another example, the objects displayed on the second layer 132 may become brighter in relation to a rotation angle of the rotary member 101. As another example, the objects displayed on the second layer 132 may become darker or lighter in transparency in relation to a rotation angle of the rotary member 101.

If detecting rotation of the rotary member 101, the control module 140 may control the display 130 to display a name of an object (e.g., an application name) with the object. For example, an object name may not be displayed in a state where the rotary member 101 is stopped, but a name of an object may be displayed with each of the objects displayed on the first layer 131 while the rotary member 101 rotates.

If detecting rotation of the rotary member 101, the control module 140 may control the display 130 to display an indicator indicating the number of object groups and an order of an object group that is currently being displayed on the first layer 131.

If determining that the rotary member 101 rotates by a predetermined angle $\Theta$ (e.g., an angle of 15 or 30 degrees) while an object group is displayed on the first layer 131 (i.e., if a rotation angle of the rotary member 101 arrives at the predetermined angle), the control module 140 may control the display 130 to change the object group displayed on the first layer 131 to another object group. For example, if the rotary member 101 rotates at intervals of the predetermined angle $\Theta$ and if the rotary member 101 rotates by the predetermined angle $\Theta$, the object group displayed on the first layer 131 may be changed to another object group.

If a rotation angle of the rotary member 101 is within a predetermined range while the object group is displayed on the first layer 131, the control module 140 may control the display 130 to change the object group displayed on the first layer 131 to another object group. For example, if the rotary member 101 freely rotates at all angles, not at intervals of a predetermined angle $\Theta$, and if a rotation angle of the rotary member 101 is within a predetermined range including the predetermined angle $\Theta$, the object group displayed on the first layer 131 may be changed to another object group.

According to an embodiment of the present disclosure, the predetermined range may be an angle range including a predetermined angle. For example, if the predetermined angle is 15 degrees, the predetermined range may be 7.5 degrees to 15 degrees.

If determining that the rotary member 101 rotates by the predetermined angle $\Theta$ (e.g., the angle of 15 or 30 degrees) while an object group is displayed on the second layer 132, the control module 140 may control the display 130 to change the object group displayed on the second layer 132 to another object group.

If a rotation angle of the rotary member 101 is within a predetermine range while the object group is displayed on the second layer 132, the control module 140 may control the display 130 to change the object group displayed on the second layer 132 to another object group. For example, if the rotary member 101 freely rotates at all angles, not at intervals of a predetermined angle Θ, and if a rotation angle of the rotary member 101 is within a predetermined range including the predetermined angle Θ, the object group displayed on the second layer 132 may be changed to another object group.

The control module 140 may control the display 130 to change the object group displayed on the second layer 132 to an object group corresponding to a rotation direction of the rotary member 101. For example, if the rotary member 101 rotates in the left direction by a predetermined angle, the control module 140 may control the display 130 to display an object group prior to the object group displayed on the second layer 132. If the rotary member 101 rotates in the right direction by a predetermined angle, the control module 140 may display the display 130 to display an object group subsequent to the object group displayed on the second layer 132.

FIGS. 6A to 6H illustrate a user interface according to an embodiment of the present disclosure. In FIGS. 6A to 6H, object groups are displayed on both of a first layer and a second layer.

Referring to FIG. 6A, while content (e.g., a watch image) is displayed on a display 130, a swipe touch operation from an outer side of the display 130 toward an inner side of the display 130 is input.

Referring to FIG. 6B, in response to the swipe touch operation, a first layer of the display 130 displays a first object group including objects Ob 1, Ob 2, Ob 3, and Ob 4, and a second layer of the display 130 displays a second object group including objects Ob 5, Ob 6, Ob 7, and Ob 8. The objects Ob 1, Ob 2, Ob 3, and Ob 4 displayed on the first layer may be displayed to become larger and brighter than the objects Ob 5, Ob 6, Ob 7, and Ob 8 displayed on the second layer.

Referring to FIG. 6C, the rotary member 101 rotates in a right direction in a while the first and second object groups are displayed on the display 130.

Referring to FIG. 6D, in response to the rotary member 101 rotating at a second angle 13 with respect to a first angle 11 in the right direction, the objects Ob 5, Ob 6, Ob 7, and Ob 8 displayed on the second layer gradually move in response to a rotation angle of the rotary member 101. For example, if the rotary member 101 rotates by a predetermined angle Θ, the objects Ob 5, Ob 6, Ob 7, and Ob 8 displayed on the second layer may be completely overlapped with the objects Ob 1, Ob 2, Ob 3, and Ob 4 displayed on the first layer.

Also, if the rotary member 101 rotates at the second angle 13 with respect to the first angle 11 in the right direction, the objects Ob 5, Ob 6, Ob 7, and Ob 8 displayed on the second layer may gradually become larger in size in response to a rotation angle of the rotary member 101.

Referring to FIG. 6E, if rotating at a third angle 15 through the second angle 13 with respect to the first angle 11, the rotary member 101 may rotate in the right direction by the predetermined angle Θ. If the rotary member 101 rotates the predetermined angle Θ, the first object group and the second object group displayed on the first layer and the second layer, respectively, may be changed. For example, the second object group including the objects Ob 5, Ob 6, Ob 7, and Ob 8 is displayed on the first layer, and a third object group including objects Ob 9 and Ob 10 is displayed on the second layer.

Referring to FIG. 6F, if rotating at a $4^{th}$ angle 17 with respect to the third angle 15, the rotary member 101 may rotate by another predetermined angle Θ. If the rotary member 101 rotates by the predetermined angle Θ, the second object group and the third object group displayed on the first layer and the second layer, respectively, may be changed. For example, the third object group including the objects Ob 9 and Ob 10 is displayed on the first layer. Because there is no fourth object group in this example, no object group is displayed on the second layer.

Referring to FIG. 6G, if rotating back to the third angle 15 with respect to the $4^{th}$ angle, the rotary member 101 may rotate in a left direction by the predetermined angle Θ. If the rotary member 101 rotates by the predetermined angle Θ, the third object group displayed on the first layer may be changed. For example, the second object group including objects Ob 5, Ob 6, Ob 7, and Ob 8 is again displayed on the first layer, and the third object group including the objects Ob 9 and Ob 10 is again displayed on the second layer.

Referring to FIG. 6H, if rotating back to the first angle 11 with respect to the third angle 15, the rotary member 101 may rotate in the left direction by the predetermined angle θ. If the rotary member 101 rotates by the predetermined angle θ, the second object group and the third object group displayed on the first layer and the second layer, respectively, may be changed. For example, the first object group including the objects Ob 1, Ob 2, Ob 3, and Ob 4 is displayed on the first layer, and the second object group including the objects Ob 5, Ob 6, Ob 7, and Ob 8 is displayed on the second layer.

FIGS. 7A to 7D illustrate a user interface according to an embodiment of the present disclosure. In FIGS. 7A to 7D, an object group is displayed on a second layer while a rotary member 101 rotates.

Figure 7A:
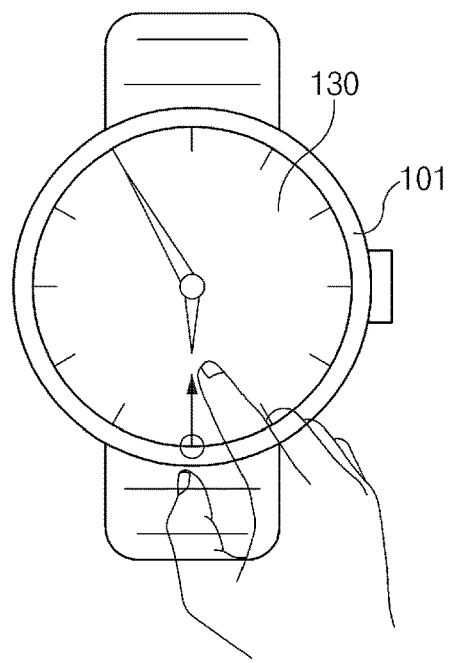
FIGS. 7A, 7B, 7C, and 7D illustrate a user interface according to an embodiment of the present disclosure.

Referring to FIG. 7A, while content (e.g., a watch image) is displayed on a display 130, a swipe touch operation from an outer side of the display 130 toward an inner side of the display 130 is input.

Figure 7B:
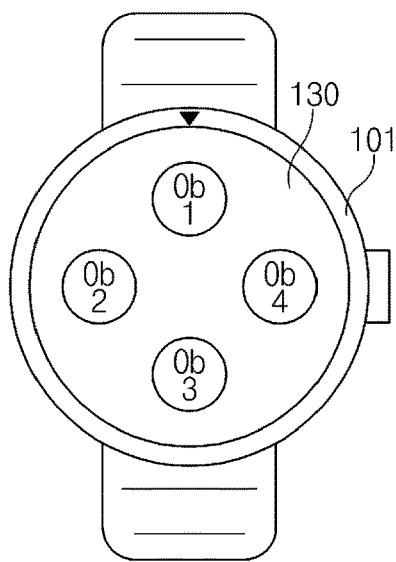

Referring to FIG. 7B, in response to the swipe touch operation, a first layer of the display 130 displays a first object group including objects Ob 1, Ob 2, Ob 3, and Ob 4.

Figure 7C:
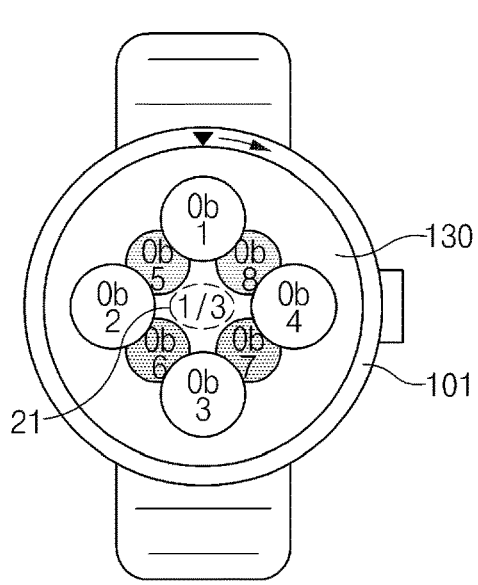

Referring to FIG. 7C, in response to the rotary member 101 rotating in a right direction while the first layer displays the first object group and the second layer does not display an object group, the second layer of the display 130 displays a second object group including objects Ob 5, Ob 6, Ob 7, and Ob 8 according to the rotation of the rotary member 101. The display 130 (e.g., the first layer) displays an indicator 21 according to the rotation of the rotary member 101. The indicator 21 may include the number of all object groups and an order of an object group which is currently being displayed on the first layer. For example, the indicator 21 illustrated in FIG. 7C indicates that the first object group is displayed among three object groups.

Figure 7D:
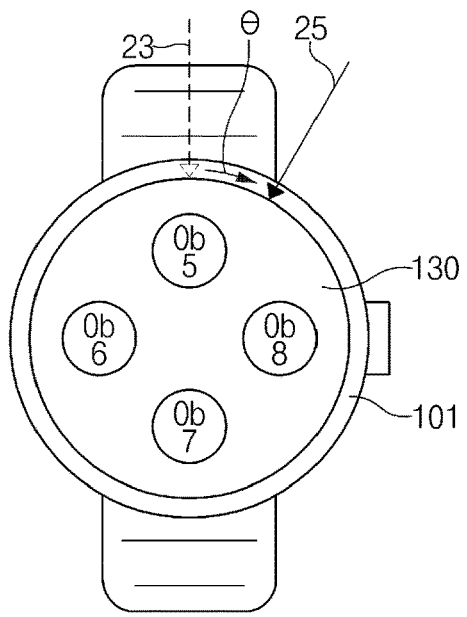

Referring to FIG. 7D, in response to rotating at a second angle 25 with respect to a first angle 23, i.e., the rotary member 101 rotating in the right direction by a predetermined angle θ, the first object group displayed on the first layer is changed. For example, the first layer displays the second object including the objects Ob 5, Ob 6, Ob 7, and Ob 8. The second object group including the objects Ob 5, Ob 6, Ob 7, and Ob 8 displayed on the second layer while the rotary member 101 rotates, as illustrated in FIG. 7C, disappears from the second layer when the rotation of the rotary member 101 is stopped. That is, in this example user interface, the second layer of the display 130 may display the second object group only while the rotary member 101 rotates.

FIGS. 8A to 8D illustrate a user interface according to an embodiment of the present disclosure. In FIGS. 8A to 8D, a different object is displayed on a second layer, according to a rotation direction, while the rotary member 101 rotates.

Figure 8A:
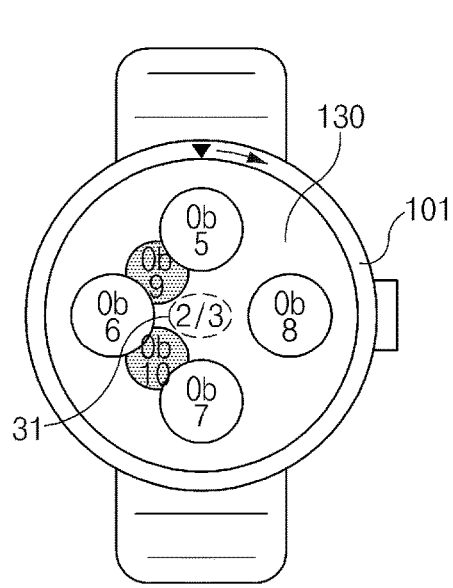
FIGS. 8A, 8B, 8C, and 8D illustrate a user interface according to an embodiment of the present disclosure.

Referring to FIG. 8A, in response to the rotary member 101 rotating in a right direction on a user interface screen as illustrated in FIG. 7D, the second layer of a display 130 displays a third object group including objects Ob 9 and Ob 10. The display 130 (e.g., a first layer) displays an indicator 31 according to rotation of the rotary member 101. For example, in FIG. 8A, the indicator 31 indicates that a second object group among the three object groups is displayed on the first layer.

Figure 8B:
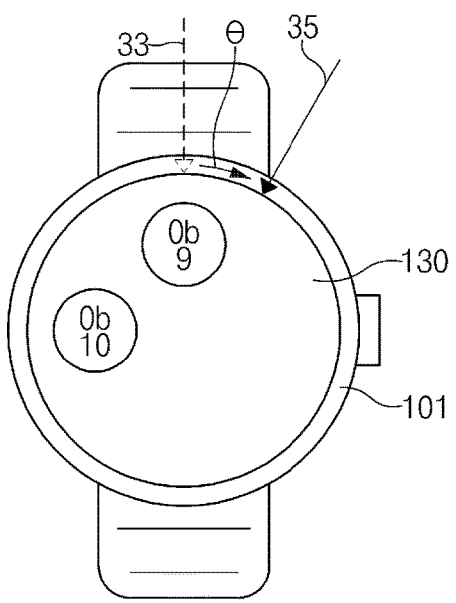

Referring to FIG. 8B, in response to rotating at a second angle 35 with respect to a first angle 33, i.e., the rotary member 101 may rotate in the right direction by a predetermined angle θ, the second object group displayed on the first layer may be changed. For example, the first layer displays the third object group including the objects Ob 9 and Ob 10. The third object group including the objects Ob 9 and Ob 10 displayed on the second layer while the rotary member 101 rotates, as illustrated in FIG. 8A, disappears from the second layer when the rotation of the rotary member 101 stops.

Figure 8C:
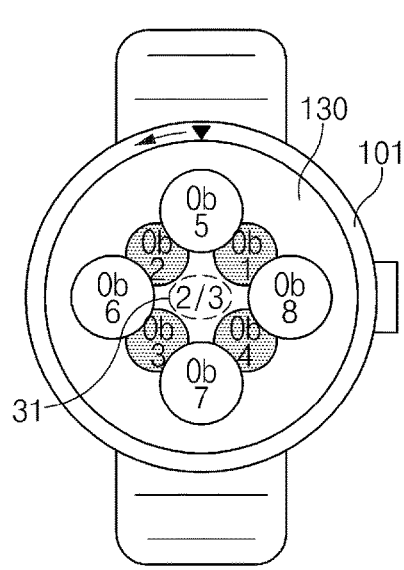

Referring to FIG. 8C, in response to the rotary member 101 rotating in a left direction on the user interface screen illustrated in FIG. 7D, the second layer of the display 130 displays the first object group including objects Ob 1, Ob 2, Ob 3, and Ob 4. The display 130 (e.g., the first layer) may display the indicator 31 according to the rotation of the rotary member 101. For example, in FIG. 8C, the indicator 31 indicates that the second object group among the three object groups is displayed on the first layer.

Figure 8D:
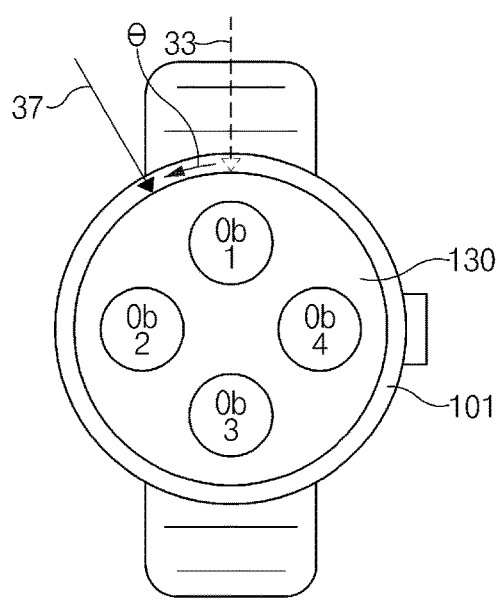

Referring to FIG. 8D, in response to rotating at a third angle 37 with respect to the first angle 33, i.e., the rotary member 101 may rotate in the left direction by the predetermined angle θ, the second object group displayed on the first layer may be changed. For example, the first layer displays the first object group including the objects Ob 1, Ob 2, Ob 3, and Ob 4. The first object group including the objects Ob 1, Ob 2, Ob 3, and Ob 4 displayed on the second layer while the rotary member 101 rotates, as illustrated in FIG. 8C, disappears from the second layer when the rotation of the rotary member 101 is stops.

Figure 9A:
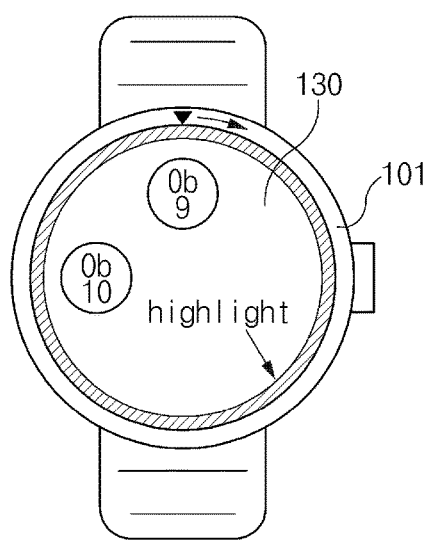
FIGS. 9A, 9B, and 9C illustrate a graphic effect according to an embodiment of the present disclosure.
Figure 9B:
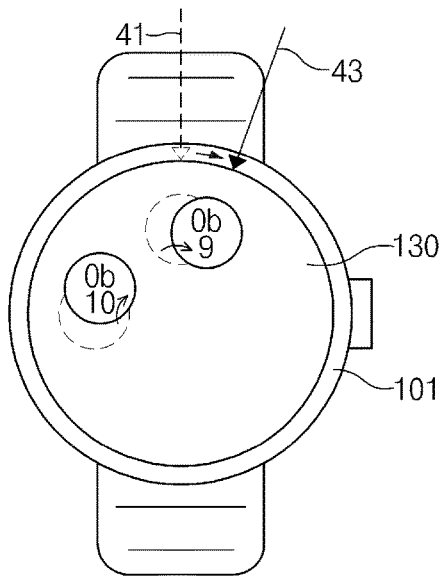
Figure 9C:
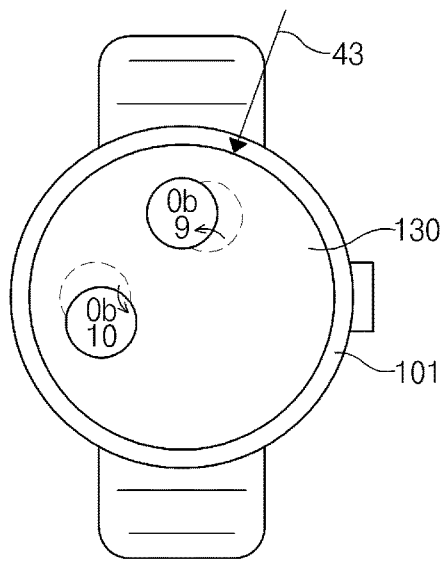

FIGS. 9A to 9C illustrate a graphic effect according to an embodiment of the present disclosure.

Referring to FIG. 9A, if there is no object group corresponding to a rotation direction of a rotary member 101, a control module 140 may control a display 130 to display a graphic effect indicating that there is no object group corresponding to the rotation direction of the rotary member 101. For example, if the rotary member 101 rotates in a right direction in while the last object group is displayed on a first layer or if the rotary member 101 rotates in a left direction in while a first object group is displayed on the first layer, the display 130 may display a graphic effect.

If there is no object group corresponding to a rotation direction of the rotary member 101, at least part of the display 130 may display a highlight effect. For example, in FIG. 9A, a highlight effect is displayed on an inner rim of the display 130 (i.e., a boundary portion between the display 130 and the rotary member 101).

Also, although the rotary member 101 rotates, a position, size, brightness, etc., of each of objects Ob 9 and Ob 10 displayed on the display 130 may be fixed, i.e., does not change.

Further, if there is no object group corresponding to a rotation direction of the rotary member 101, the display 130 may display a graphic effect in which an object displayed on the display 130 returns to an original position, after the object displayed on the display 130 moves according to rotation of the rotary member 101. For example, referring to FIG. 9B, if the rotary member 101 rotates at a second angle 43 with respect to a first angle 41, the objects Ob 9 and Ob 10 displayed on the display 130 move according to the rotation of the rotary member 101. However, referring to FIG. 9C, when the rotation of the rotary member 101 stops at the second angle 43, because there is no object group corresponding to the rotation direction, the objects Ob 9 and Ob 10 return to their original positions.

FIGS. 10A to 10C illustrate a user interface according to an embodiment of the present disclosure.

Referring to FIG. 10A, the display 130 (e.g., a first layer) displays a first object group including objects Ob 1 to Ob 10, which are sequentially disposed in a clockwise direction.

The user interface displayed on the display 130 includes an indicator 51, which indicates an object group that is currently being displayed among all object groups. For example, the indicator 51 includes a circle corresponding to each of three object groups. The circle corresponding to the object group that is currently being displayed, i.e., the first object group, is displayed differently than the other circles. For example, in FIG. 10A, a left circle corresponding to the first object group is filled with a color different from the other circles.

The user interface displayed on the display 130 also includes a pointer 53 indicating a currently selected object. For example, referring to FIG. 10A, the pointer 53 is displayed on a position corresponding to the first object Ob 1. Accordingly, a user may verify the currently selected object using the position of the pointer 53.

The position of the pointer 53 may change according to rotation of the rotary member 101. For example, if the rotary member 101 rotates by a predetermined angle θ, the pointer 53 may move to a position corresponding to an object located in a rotation direction of the rotary member 101.

Referring to FIG. 10B, in response to rotating at a second angle 57 with respect to a first angle 55, i.e., the rotary member 101 rotating in a right direction (or a clockwise direction) by the predetermined angle θ, the pointer 53 moves to a position corresponding to the second object Ob 2 located in the rotation direction of the rotary member 101.

If the rotary member 101 rotates by multiple increments of a predetermined angle (e.g., two times) in a predetermined time (e.g., 0.3 second), the pointer 53 may move to a position corresponding to an object lastly located in the rotation direction of the rotary member 101.

Referring to FIG. 10C, in response to rotating at a third angle 59 with respect to the second angle 57, i.e., the rotary member 101 rotates in the right direction (or the clockwise direction) by two times 20 of the predetermined angle in the predetermined time, the pointer 53 moves to a position corresponding to the $10^{th}$ object Ob 10 lastly located in the rotation direction of the rotary member 101.

FIGS. 11A to 11D illustrate a user interface according to an embodiment of the present disclosure.

Figure 11A:
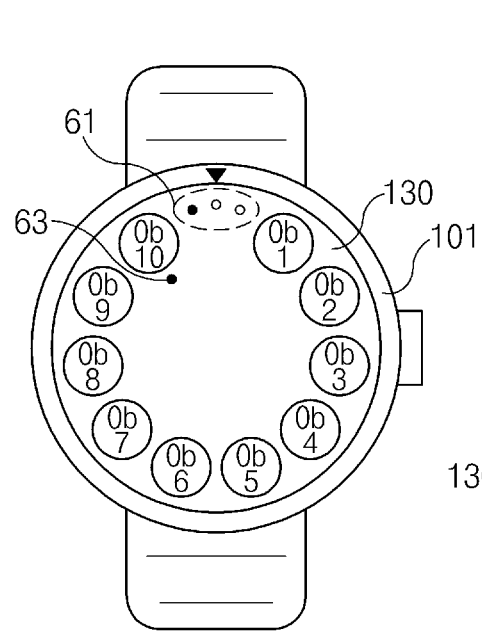
FIGS. 11A, 11B, 11C, and 11D illustrate a user interface according to an embodiment of the present disclosure.

Referring to FIG. 11A, the display 130 (e.g., a first layer) displays a first object group including objects Ob 1 to Ob 10, sequentially disposed in a clockwise direction.

The user interface displayed on the display 130 includes an indicator 61 that indicates an object group that is currently being displayed among all object groups. For example, in FIG. 11A, the indicator 61 includes a circle corresponding to each of three object groups, wherein the circle corresponding to the object group that is currently being displayed, i.e., the first object group, is displayed differently than the other circles representing the other object groups that are not displayed.

The user interface displayed on the display 130 also include a pointer 63 indicating a currently selected object. For example, in FIG. 11A, the pointer 63 is displayed on the $10^{th}$ object Ob 10.

Figure 11B:
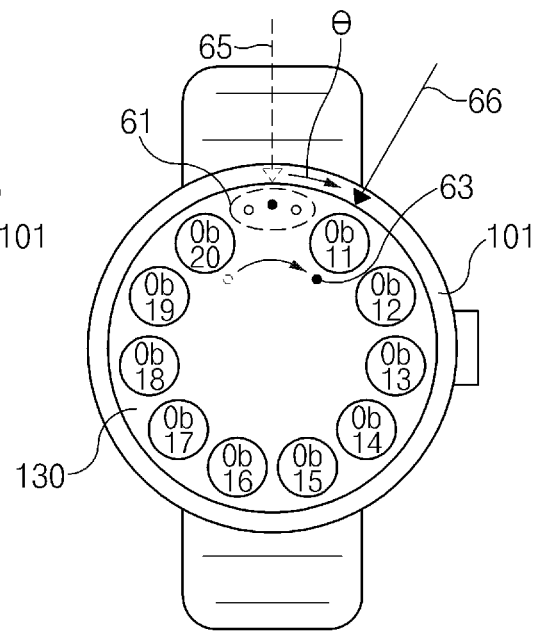

Referring to FIG. 11B, in response to the rotary member 101 rotating in a predetermined direction while the pointer 63 is displayed on object Ob 10, the display 130 displays objects included in the next object group, i.e., object group 2. For example, in FIG. 11B, in response to rotating at a second angle 66 with respect to a first angle 65 in a right direction (or a clockwise direction), i.e., by a predetermined angle θ, the display 130 displays the second object group including objects Ob 11 to Ob 20 and the pointer 63 moves to a position corresponding to object Ob 11, which is located in a rotation direction of the rotary member 101.

Additionally, the indicator 61 is changed to correspond to the second object group. For example, in FIG. 11B, a second circle (i.e., a circle located in the middle) corresponding to the second object group among three circles included in the indicator 61 is filled with a color, and the color is removed from the first circle.

Figure 11C:
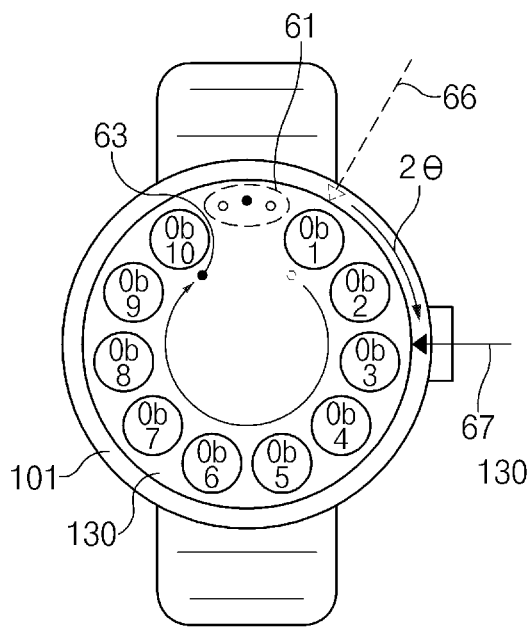

Referring to FIG. 11C, in response to rotating at a third angle 67 with respect to the second angle 66, i.e., the rotary member 101 rotating in the right direction (or the clockwise direction) by two times the predetermined angle 2θ in a predetermined time, the pointer 63 moves to a position corresponding to the object Ob 20 lastly located in the rotation direction of the rotary member 101.

Figure 11D:
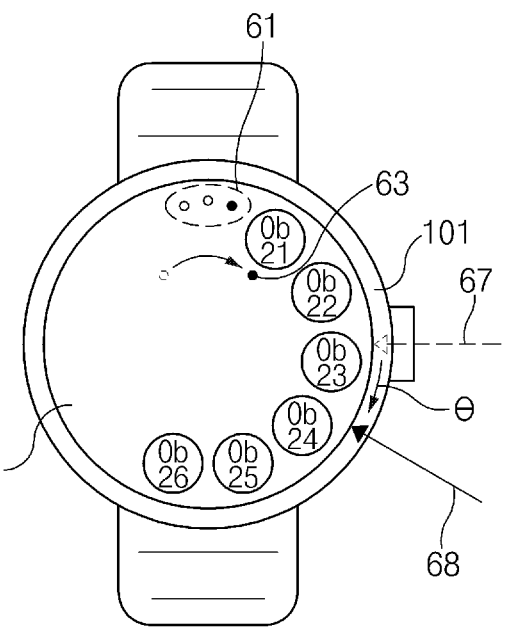

Referring to FIG. 11D, in response to rotating at a $4^{th}$ angle 68 with respect to the third angle 67 while displaying the display of FIG. 11C, i.e., the rotary member 101 rotating in the right direction (or the clockwise direction) by a predetermined angle θ, the display 130 displays a third object group including objects Ob 21 to Ob 26 included in and the pointer 63 moves to a position corresponding to object 21, which is located in the rotation direction of the rotary member 101. Further, a third circle (i.e., a circle located at a right side) corresponding to the third object group among the first to third circles included in the indicator 61 is filled with the color, and the color is removed from the second circle.

Figure 12:
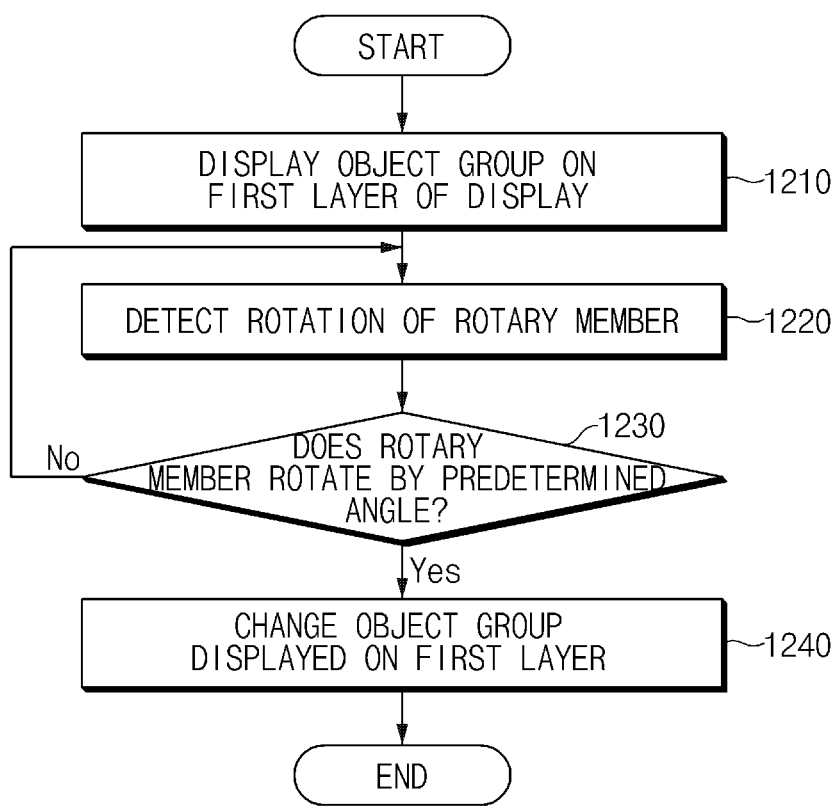
FIG. 12 is a flowchart illustrating a display method of an electronic device according to an embodiment of the present disclosure.

FIG. 12 is a flowchart illustrating a display method of an electronic device according to an embodiment of the present disclosure.

Referring to FIG. 12, in step 1210, an electronic device, e.g., the electronic 100 illustrated in FIG. 1, displays an object group on a first layer of a display. For example, the electronic device may display an object group on at least one of the first layer or the second layer of the display, may display object groups on both of the first layer and the second layer, or may display an object group on only the first layer.

For example, the electronic device may display an object group on the first layer of the display in response to a user input, e.g., a predetermined touch input or a predetermined number button presses.

In step 1220, the electronic device detects rotation of a rotary member. For example, the electronic device may determine whether the rotary member rotates, a rotation angle of the rotary member, and a rotation direction of the rotary member.

For example, if detecting rotation of the rotary member while the first layer displays an object group (e.g., a first object group) and the second layer does not display an object group, the electronic device may display a second object group on the second layer. For example, the electronic device may display an object group, corresponding to a rotation direction of the rotary member 101, on the second layer.

The electronic device may change at least one of a position, a size, brightness, transparency, or a color of an object, displayed on the second layer, according to a rotation direction and a rotation angle of the rotary member.

Further, if detecting rotation of the rotary member, the electronic device may display a name of an object (e.g., an application name) with the object on the display.

If detecting rotation of the rotary member, the electronic device may display an indicator, indicating the number of object groups and an order of an object group that is currently being displayed on the first layer.

If there is no object group corresponding to a rotation direction of the rotary member, the electronic device may display a graphic effect, indicating that there is no object group corresponding to the rotation direction of the rotary member.

In step 1230, the electronic device determines whether the rotary member rotates by a predetermined angle (e.g., an angle of 15 or 30 degrees).

If the rotary member does not rotate by the predetermined angle (i.e., if a rotation angle of the rotary member is less than the predetermined angle) in step 1230, the electronic device continuously detects the rotation of the rotary member in step 1220.

However, if determining that the rotary member rotates by the predetermined angle in step 1230, the electronic device changes an object group displayed on the first layer of the display in step 1240. For example, if the rotary member rotates by the predetermined angle while the first layer displays the first object group, the electronic device may change the first object group displayed on the first layer to the second object group.

If detecting that the rotary member rotates by the predetermined angle θ (e.g., the angle of 15 or 30 degrees) in while the second layer displays an object group, the electronic device may change the object group displayed on the second layer to another object group. For example, if the rotary member rotates by the predetermined angle while the second layer displays the second object group, the electronic device may change the second object group displayed on the second layer to a third object group.

Each of the above-mentioned elements of the electronic device according to various embodiments of the present disclosure may be configured with one or more components, and the names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

The terminology "module" used herein may mean, for example, a unit including one of hardware, software, and firmware or two or more combinations thereof. The terminology "module" may be interchangeably used with, for example, terminologies "unit", "logic", "logical block", "component", or "circuit", etc. A "module" may be a minimum unit of an integrated component or a part thereof. A "module" may be a minimum unit performing one or more functions or a part thereof. A "module" may be mechanically or electronically implemented. For example, a "module" may include at least one of an application-specific integrated circuit (ASIC) chip, field-programmable gate arrays (FPGAs), or a programmable-logic device, which is known or will be developed in the future, for performing certain operations.

According to various embodiments of the present disclosure, at least part of an electronic device (e.g., modules or the functions) or a method (e.g., operations) may be implemented with, for example, instructions stored in computer-readable storage media which have a program module. When the instructions are executed by a processor (e.g., the control module 140 of FIG. 2), one or more processors may perform functions corresponding to the instructions.

The computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), or a flash memory, etc.), etc. Also, the program instructions may include mechanical codes compiled by a compiler and also high-level language codes which may be executed by a computer using an interpreter and the like. The above-mentioned hardware device may be configured to operate as one or more software modules to perform operations according to various embodiments of the present disclosure, and vice versa.

Modules or program modules according to various embodiments of the present disclosure may include at least one or more of the above-mentioned components, some of the above-mentioned components may be omitted, or other additional components may be further included therein. Operations executed by modules, program modules, or other elements may be executed by a successive method, a parallel method, a repeated method, or a heuristic method. Also, some of the operations may be executed in a different order or may be omitted, and other operations may be added.

According to various embodiments of the present disclosure, the electronic device may provide an intuitive and efficient user interface using a rotatable input device included in the electronic device and may provide a plurality of content on a display screen of a limited size.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. An electronic device, comprising:
a display;
a rotary member configured to surround the display and rotatable around the display in a first direction or in a second direction opposite to the first direction; and
a processor configured to:
display, on the display, objects included in a first object group, the objects included in the first object group are respectively placed in positions consecutively disposed in the first direction, and a pointer indicating a single object in the first object group, and
display, on the display, at least one object included in a second object group in response to a rotation of the rotary member in the first direction, if, prior to the rotation of the rotary member, the single object indicated by the pointer corresponds to a last positioned object of the first object group in the first direction,
wherein the at least one object included in the second object group is placed in at least one of the positions consecutively disposed in the first direction which the objects included in the first object group are previously placed,
wherein the at least one object included in the second object group is different from each of the objects included in the first object group, and
wherein the processor is further configured to display, on the display, the first object group on a first layer and the second object group on a second layer located under the first layer in response to the rotation of the rotary member.

2. The electronic device of claim 1, wherein the processor is further configured to remove the first object group from the first layer of the display and display the second object group, in response to the rotary member rotating in the first direction by a predetermined angle.

3. The electronic device of claim 2, wherein the processor is further configured to move the pointer to a position corresponding to the last positioned object in the first direction of the rotary member, when the rotary member rotates by a multiple of the predetermined angle in a predetermined time in the first direction.

4. The electronic device of claim 2, wherein the rotary member rotates at intervals of the predetermined angle, and
wherein the rotary member automatically rotates to a rotation angle corresponding to the intervals of the predetermined angle, if a rotation angle of the rotary member made by a user of the electronic device is different from the intervals of the predetermined angle.

5. The electronic device of claim 1, wherein the second object group is an object group corresponding to the first direction of the rotary member.

6. The electronic device of claim 5, wherein the processor is further configured to display a graphic effect indicating that there is no second object group corresponding to the rotation direction of the rotary member, if there is no second object group corresponding to the rotation direction of the rotary member.

7. The electronic device of claim 1, wherein, when a first object group is displayed on the display, the processor is further configured to display a name of a first object included in the first object group displayed on the first layer, when the rotation of the rotary member is detected.

8. The electronic device of claim 1, wherein the processor is further configured to display an indicator indicating a total number of object groups and an order of an object group that is currently displayed on the display.

9. The electronic device of claim 1, wherein the objects included in the first object group and the at least one object included in the second object group includes an icon corresponding to an application, a menu, or a notification message.

10. A method for displaying object groups on a display of an electronic device, the method comprising:
- displaying, on the display, objects included in a first object group and a pointer indicating a single object in the first object group, the objects included in the first object group being respectively placed in positions consecutively disposed in a first direction;
- moving the pointer according to a first rotation of a rotary member of the electronic device, wherein the rotary member is configured to surround the display and is rotatable around the display in the first direction or in a second direction opposite to the first direction;
- in response to a second rotation of the rotation member in the first direction, displaying, on the display, at least one object included in a second object group,
- wherein prior to the second rotation of the rotary member, the single object indicated by the pointer corresponds to a last positioned object of the first object group in the first direction,
- wherein the at least one object included in the second object group is placed in at least one of the positions consecutively disposed in the first direction which the objects included in the first group are previously placed,
- wherein the at least one object included in the second object group is different from each of the objects included in the first object group, and
- wherein the first object group is displayed on a first layer and the second object group is displayed on a second layer located under the first layer in response to the first rotation of the rotary member is detected.

11. The display method of claim 10, wherein displaying at least one object included in the second object group comprises:
- removing the first object group from the display; and
- displaying the second object group on the display, in response to the rotary member rotating in the first direction by the predetermined angle.

12. The display method of claim 11, wherein moving the pointer comprises moving the pointer to a position corresponding to the last positioned object in the first direction of the rotary member, when the rotary member rotates by a multiple of the predetermined angle in a predetermined time in the first direction.

13. The display method of claim 10, wherein the second object group is an object group corresponding to the first direction of the rotary member.

* * * * *